US012078010B2

(12) United States Patent
Fontijn

(10) Patent No.: US 12,078,010 B2
(45) Date of Patent: Sep. 3, 2024

(54) IMPACT DAMPENING PROTECTION DEVICE

(71) Applicant: GOLDBRECHT LLC, Culver City, CA (US)

(72) Inventor: Marcel Fontijn, Culver City, CA (US)

(73) Assignee: GOLDBRECHT LLC, Culver City, CA (US)

( * ) Notice: Subject to any disclaimer, the term of this patent is extended or adjusted under 35 U.S.C. 154(b) by 86 days.

(21) Appl. No.: 17/557,880

(22) Filed: Dec. 21, 2021

(65) Prior Publication Data

US 2022/0195789 A1 Jun. 23, 2022

Related U.S. Application Data

(60) Provisional application No. 63/129,869, filed on Dec. 23, 2020.

(51) Int. Cl.
*E06B 9/02* (2006.01)
*E04B 1/82* (2006.01)
*E04B 9/18* (2006.01)
*E06B 3/30* (2006.01)
*E06B 9/00* (2006.01)

(52) U.S. Cl.
CPC .................. *E06B 9/02* (2013.01); *E06B 3/30* (2013.01); *E04B 2001/8272* (2013.01); *E04B 2009/186* (2013.01); *E06B 2009/005* (2013.01)

(58) Field of Classification Search
CPC ........ E04B 9/245; E04B 9/001; E04B 2/7457; E04B 1/82; E04B 2001/8272; E04B 2002/7466; E04B 2/7409; E04B 1/84; E06B 9/02; E06B 2009/005
USPC ........ 52/144, 145, 476, 483.1, 489.1, 489.2, 52/781.3, 506.05, 509, 510, 511, 512, 52/481.1; 181/208, 403.1
See application file for complete search history.

(56) References Cited

U.S. PATENT DOCUMENTS

| | | | | |
|---|---|---|---|---|
| 1,610,578 A * | 12/1926 | Murphy | E04B 1/8218 | 52/480 |
| 4,544,587 A * | 10/1985 | Nesbitt | E06B 3/285 | 428/920 |
| 4,719,730 A * | 1/1988 | Winkowski | E04B 2/7411 | 52/489.1 |
| 5,722,206 A * | 3/1998 | McDonald | E06B 9/02 | 49/51 |
| 6,155,009 A * | 12/2000 | Pena | E06B 9/02 | 52/171.3 |
| 8,910,441 B1 * | 12/2014 | Hunter | E04F 13/007 | 52/489.1 |
| 9,045,898 B2 * | 6/2015 | Ravnaas | E04B 2/7409 | |
| 9,200,439 B1 * | 12/2015 | Egri, II | E04B 2/7457 | |
| 2004/0221972 A1 * | 11/2004 | Tomlinson | E04B 9/045 | 160/327 |

(Continued)

*Primary Examiner* — Brian D Mattei
*Assistant Examiner* — Omar F Hijaz
(74) *Attorney, Agent, or Firm* — Sughrue Mion, PLLC

(57) ABSTRACT

An impact dampening device for protecting a structure, may include an impact dampening fixture; an attachment device provided on the dampening fixture for attaching the dampening fixture to the structure; and a mounting device provided on the dampening fixture, the mounting device being configured to have a protective panel mounted thereon, wherein the dampening fixture dampens a force applied to the protective panel to reduce or eliminate impact on the structure.

18 Claims, 3 Drawing Sheets

(56) References Cited

U.S. PATENT DOCUMENTS

| | | | | |
|---|---|---|---|---|
| 2008/0086966 | A1* | 4/2008 | Stevens | F16F 1/3732<br>52/347 |
| 2008/0202846 | A1* | 8/2008 | Gernhart | F16F 15/04<br>181/208 |
| 2009/0283359 | A1* | 11/2009 | Ravnaas | E04B 9/001<br>181/286 |
| 2016/0348418 | A1* | 12/2016 | Wexler | E06B 9/24 |

* cited by examiner

IMPACT DAMPENING PROTECTION DEVICE

CROSS REFERENCE TO RELATED APPLICATION

The present application claims priority to provisional application U.S. 63/129,869 filed on Dec. 23, 2020 which is hereby expressly incorporated by reference, in its entirety, into the present application

BACKGROUND OF THE INVENTION

Field of the Invention

The invention relates to an impact dampening device to be applied to a structure to protect the structure from damage.

Background

There is a need to easily and cost effectively provide a protective barrier on windows and doors of buildings and homes for protection from vandalism, storms or the like.

SUMMARY OF THE INVENTION

According to an aspect of an example embodiment, an impact dampening device for protecting a structure, may include an impact dampening fixture; an attachment device provided on the dampening fixture for attaching the dampening fixture to the structure; and a mounting device provided on the dampening fixture, the mounting device being configured to have a protective panel mounted thereon, wherein the dampening fixture dampens a force applied to the protective panel to reduce or eliminate impact on the structure.

The attachment device may include a plurality of attachment devices.

Further, the mounting device may include an impact absorbing bumper disposed between the panel and the dampening fixture.

Further, the attachment device may include a plurality of attachment members and the mounting device includes a plurality of mounting members.

Still further, the dampening fixture may include a plurality of dampening bars.

Still further, the mounting members may be offset along the dampening bars from the attachment members. Additionally, the dampening bars may include rigid portions that are intermittently disposed with less rigid, dampening portions.

The dampening portions may be disposed between the attachment members and the mounting members on each of the dampening bars.

The mounting members may include impact absorbing bumpers disposed between the panel and each of the dampening bars.

The structure to be protected may be a glass window or door, marble or polished stone, or other cladding material. The panel may include plywood.

BRIEF DESCRIPTION OF THE DRAWINGS

Further features, nature, and various advantages of the disclosed subject matter will be more apparent from the following detailed description and the accompanying drawings in which.

DETAILED DESCRIPTION OF THE INVENTION

Referring to the figures, the invention relates to an impact dampening device 10 that can easily and cost effectively be attached to structures, such as doors and windows 12 or any other structure that is desired to be protected.

Figure 1:
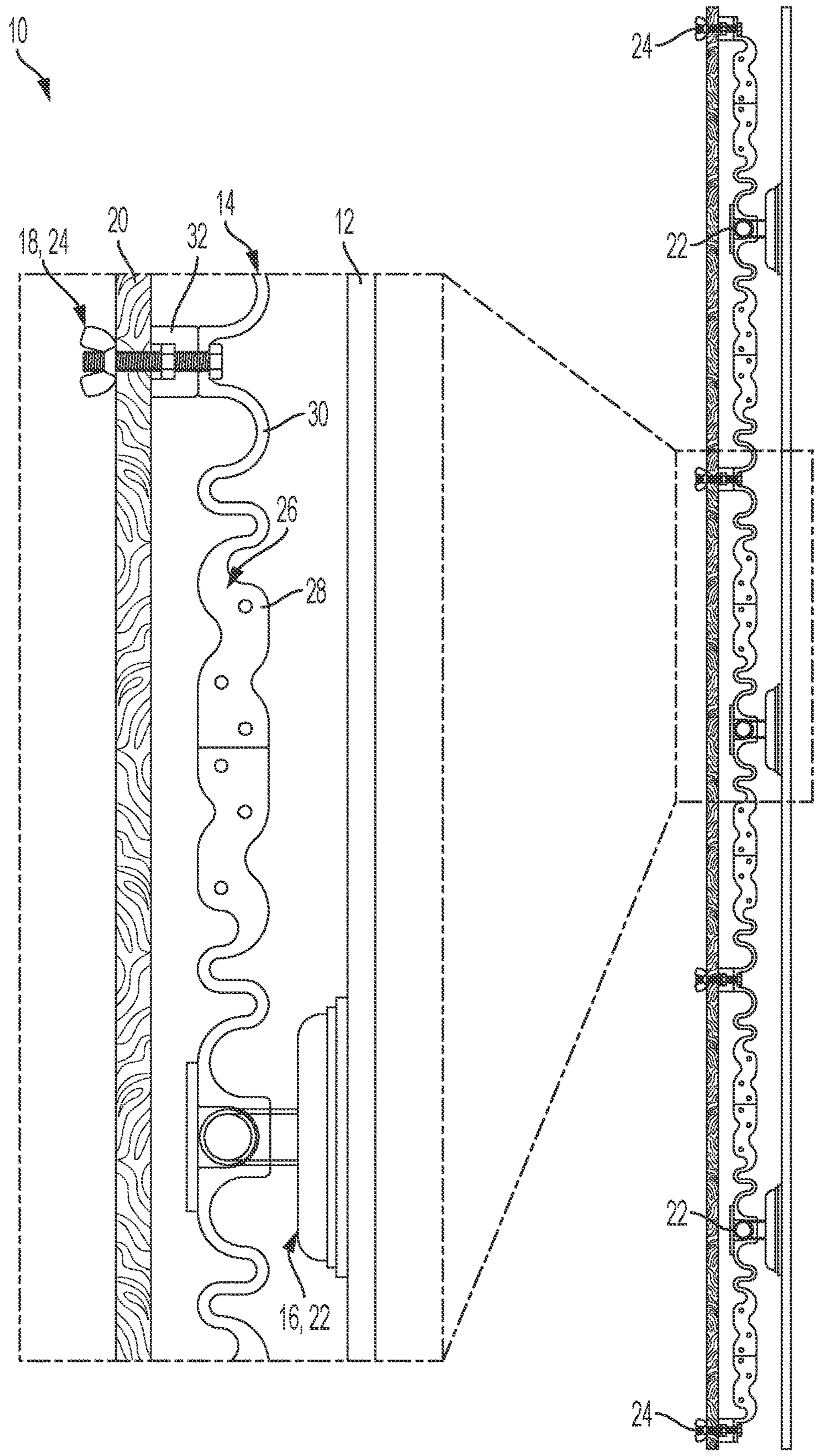
FIG. 1 is an exploded view of the impact dampening device secured to a structure to be protected and having a protective panel mounted thereon.
Figure 2:
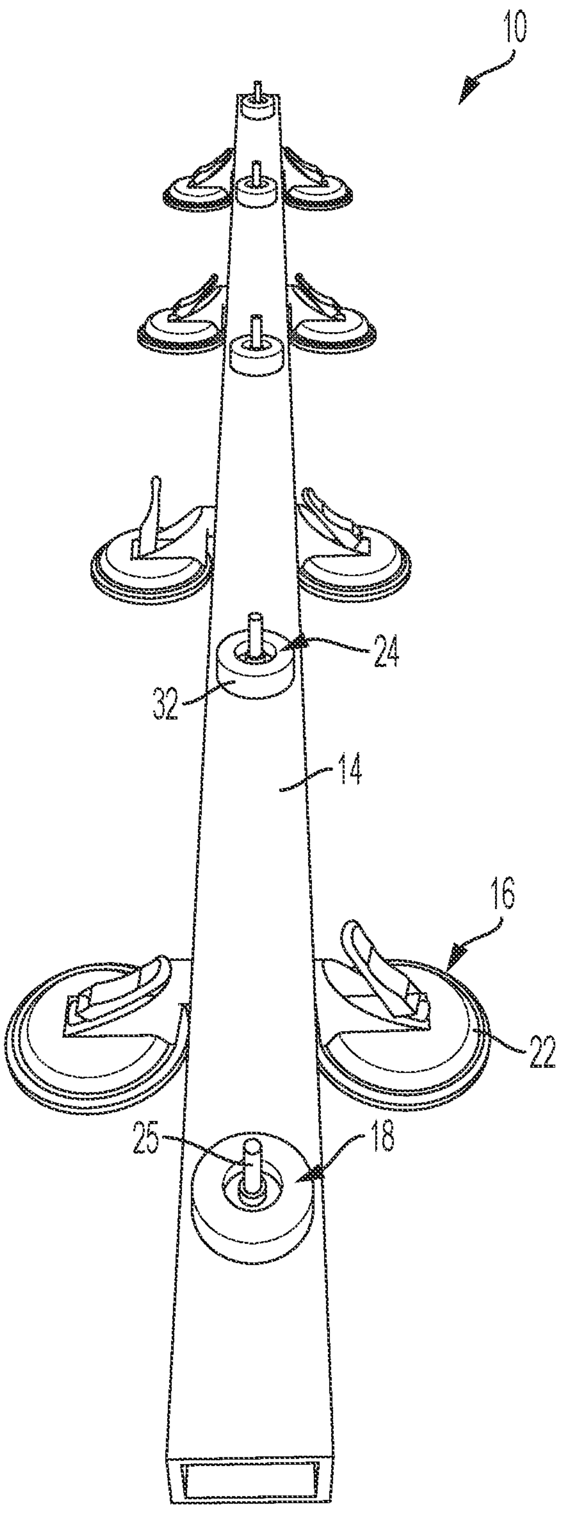
FIG. 2 is a perspective view of the impact dampening device.

Referring to FIGS. 1 and 2, the dampening device 10 includes an impact dampening fixture 14, an attachment device 16 provided on the dampening fixture for attaching the dampening fixture to the structure to be protected 12; and a mounting device 18 provided on the dampening fixture 14 for mounting a protective panel 20 to the dampening fixture 14 such that impact dampening fixture 14 dampens a force applied to the protective panel 20 to reduce impact on the structure to be protected 12.

As noted above, examples of a structure to be protected 12 includes windows or doors on homes or building, but the invention is not intended to be limited to these examples. For convenience, the invention is described below and protecting doors and windows.

The attachment device 16 may include a plurality of attaching members 22 such as vacuum attachment devices or the like that can be easily secured to the doors or windows to be protected 12. The attachment devices may be attached to the dampening fixture 14 in any conventional manner.

The mounting device 18 may include a plurality of mounting members 24. In the embodiment shown here, the mounting members 24 include 25 bolts that are fixedly secured to the dampening fixture 14 as shown. Once the dampening fixture 14 has been attached to the window or door 12, the protective panel 20 may be secured to the bolts 25 using a fastening nut 27 such as a wing nut or the like.

The dampening fixture 14 may include a plurality of dampening bars 26 that are used together to attach the protective panel 20 to the door or window 12 to be protected. As shown in FIG. 1, the dampening bars 26 may include relatively rigid portions 28 and less rigid, s-shaped dampening portions 30 that are disposed along the length of each of the bars. The rigid portions 28 may be alternately arranged with respect to the dampening portions 30. The dampening portions 30 may be provided between the attaching members 22 and the mounting members 24 such that a force applied to the protective panel 20 will be dampened as it travels from the mounting members 24 secured to the protective panel 20 to the attaching members 22 secured to the glass or door 12.

As a further dampening measure, the mounting members 24 may each have an impact absorbing bumper 32, made of rubber or the like, which is secured to the dampening fixture 14 and disposed between the dampening fixture 14 and the protective panel 20. As a result, any force applied to the protective panel 20 will be dampened as it travels from the protective panel 20 to the dampening fixture 14.

Figure 3:
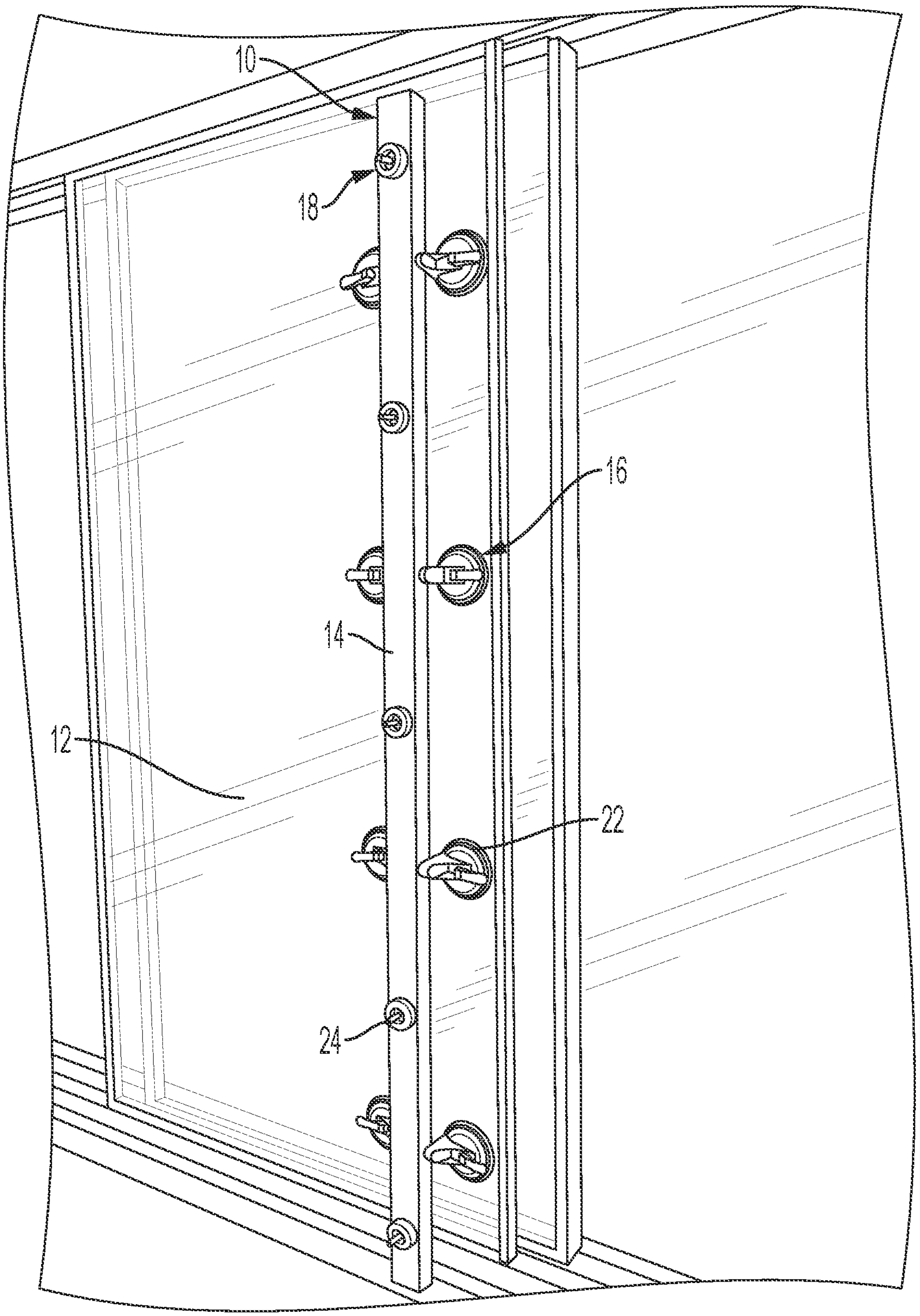
FIG. 3 is a perspective view of the impact dampening device installed on the structure to be protected.

As shown in FIG. 3, the dampening device 10 is secured to the structure to be protected 12, such as a glass window, by the attachment devices 16 provided on the dampening fixture 14. Preferably, a plurality of such dampening devices 10 are attached to the structure to be protected. Then, the protective panel 20, such as a piece of plywood, is attached to the dampening devices 10 using the mounting members 24 associated with the mounting device 18. By virtue of the dampening provided by the dampening portions 30 of the dampening fixture 14, any force that is applied to the protective panel will be dampened so as to protect the panel to be protected 12.

Naturally, the invention is not limited to the embodiments described with reference to the figures and alternative embodiments could be envisaged without leaving the scope of the invention.

The invention claimed is:

1. An impact dampening device for protecting a structure, comprising:

a protective panel;

an impact dampening fixture;

an attachment device provided on the dampening fixture for attaching the dampening fixture to the structure by suction; and a mounting device provided on the dampening fixture and separated from the attachment device by the dampening fixture, the mounting device having the protective panel mounted thereon, wherein the dampening fixture dampens a force applied to the protective panel to reduce or eliminate impact on the structure, and wherein the dampening fixture includes rigid portions that are intermittently disposed with less rigid, dampening portions.

2. The impact dampening device of claim 1, wherein the attachment device includes a plurality of attachment devices.

3. The impact dampening device of claim 2, wherein the mounting device includes an impact absorbing bumper disposed between the panel and the dampening fixture.

4. The impact dampening device of claim 1, wherein the attachment device includes a plurality of attachment members and the mounting device includes a plurality of mounting members.

5. The impact dampening device of claim 4, wherein the dampening fixture includes a plurality of dampening bars.

6. The impact dampening device of claim 5, wherein the mounting members are offset along the dampening bars from the attachment members.

7. The impact dampening device of claim 6, wherein the dampening bars include the rigid portions that are intermittently disposed with less rigid, dampening portions.

8. The impact dampening device of claim 7, wherein the dampening portions are disposed between the attachment members and the mounting members on each of the dampening bars.

9. The impact dampening device of claim 8, wherein the mounting members respectively include impact absorbing bumpers disposed between the panel and each of the dampening bars.

10. The impact dampening device of claim 1, wherein the structure is at least one of a window and door, and wherein the at least one of the window and door comprises any of glass, marble, and polished stone.

11. The impact dampening device of claim 10, wherein the panel is plywood.

12. An impact dampening device for protecting a structure, comprising:

a protective panel;

a plurality of impact dampening bars;

a plurality of suction devices provided on each of the dampening bars for attaching the dampening bars to the structure; and a plurality of mounting members provided on each of the dampening bars and offset from the suction devices by the dampening bars, the mounting members having the protective panel mounted thereon, wherein the dampening bars dampen a force applied to the protective panel to reduce impact on the structure.

13. The impact dampening device according to claim 12, wherein the suction devices comprise first faces configured to attach the dampening bars to the structure by suction between the first faces and the structure, wherein the mounting members comprise second faces configured to attach the protective panel to the dampening bars by attachment between the second faces and the protective panel, wherein the first faces of the suction devices face an opposite direction then the second faces of the mounting members.

14. The impact dampening device according to claim 13, wherein the suction devices comprise pairs of the suction devices, and wherein each of the pairs is bilaterally symmetric about a longitudinal axis of the dampening bars.

15. An impact dampening device for protecting a structure, comprising:

a protective panel;

an impact dampening fixture;

an attachment device provided on the dampening fixture for attaching the dampening fixture to the structure by suction; and a mounting device provided on the dampening fixture and separated from the attachment device by the dampening fixture, the mounting device having the protective panel mounted thereon, wherein the dampening fixture dampens a force applied to the protective panel to reduce or eliminate impact on the structure, wherein the attachment device includes a plurality of attachment members and the mounting device includes a plurality of mounting members, wherein the dampening fixture includes a plurality of dampening bars, wherein the mounting members are offset along the dampening bars from the attachment members, and wherein the dampening bars include rigid portions that are intermittently disposed with less rigid, dampening portions.

16. The impact dampening device of claim 12, wherein the plurality of dampening bars include rigid portions that are intermittently disposed with less rigid, dampening portions.

17. The impact dampening device of claim 12, wherein each of the plurality of dampening bars are connected to each other at each of the plurality of suction devices and each of the plurality of suction members.

18. The impact dampening device of claim 16, wherein the rigid portions of each of the plurality of dampening bars are disposed between each of the plurality of suction devices and each of the plurality of mounting members.

* * * * *